(12) United States Patent
Goto

(10) Patent No.: US 8,752,209 B2
(45) Date of Patent: Jun. 10, 2014

(54) INFORMATION PROCESSING APPARATUS

(75) Inventor: Ryo Goto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 558 days.

(21) Appl. No.: 12/740,683

(22) PCT Filed: Oct. 29, 2008

(86) PCT No.: PCT/JP2008/069655
§ 371 (c)(1),
(2), (4) Date: May 28, 2010

(87) PCT Pub. No.: WO2009/057641
PCT Pub. Date: May 7, 2009

(65) Prior Publication Data
US 2010/0242122 A1    Sep. 23, 2010

(30) Foreign Application Priority Data

Oct. 30, 2007    (JP) .................................. 2007-282388

(51) Int. Cl.
*G06F 21/00*    (2013.01)

(52) U.S. Cl.
USPC .................................. 726/31; 705/57; 705/58

(58) Field of Classification Search
USPC ........................................ 726/31; 705/57–58
See application file for complete search history.

(56) References Cited

U.S. PATENT DOCUMENTS

2002/0057900 A1 * 5/2002 Nakajima ........................ 386/94
2002/0184537 A1 * 12/2002 Inokuchi et al. ............... 713/202
2004/0030902 A1 * 2/2004 Asano et al. ................... 713/176
2004/0143754 A1 * 7/2004 Kori et al. ...................... 713/200

FOREIGN PATENT DOCUMENTS

| JP | 2001-351322 | | 12/2001 |
|---|---|---|---|
| JP | 2003-143571 | A | 5/2003 |
| JP | 2003-233795 | | 8/2003 |
| JP | 2005-190548 | | 7/2005 |
| JP | 2005-276085 | A | 10/2005 |
| JP | 2007-025927 | | 2/2007 |
| JP | 2007-058678 | A | 3/2007 |
| JP | 2007-172593 | | 7/2007 |
| KR | 2002-0016570 | | 3/2002 |

OTHER PUBLICATIONS

International Search Report for PCT/JP2008/069655, mailed on Dec. 9, 2008, 2 pages.
Office Action from Korean Patent Application No. 10-2010-7009529, mailed on Jun. 29, 2011.

(Continued)

*Primary Examiner* — Ghazal Shehni
(74) *Attorney, Agent, or Firm* — Duane Morris LLP

(57) ABSTRACT

An information processing apparatus (100) is provided with a memory unit (130) for storing digital broadcast content for which a number of copies that can be made is set, a writing unit (160, 162) for writing the content on external recording medium, an IC medium reader/writer (150) for reading an IC medium (300) and recording the number of copies that can be made of the content on the IC medium (300) in association with an identifier of the content, and a control unit (170) for determining whether an identifier of the content is recorded on the IC medium (300) when the content is copied to the external recording medium and, when it is determined that the identifier is recorded, controlling the writing unit (160, 162) to write the content on external recording medium (210, 220) as well as controlling the IC medium reader/writer (150) to update the number of copies that can be made of the content.

5 Claims, 9 Drawing Sheets

(56) References Cited

OTHER PUBLICATIONS

Notification of Reason for Refusal (translation) for JP 539,092/2009, mailed Aug. 30, 2011, 2 pages.

Notice of Final Rejection for Korean Patent Application No. 10-2010-7009529, mailed Jan. 20, 2012, 6 pages (including English translation).

Office Action dated Oct. 15, 2013 in corresponding Japanese Patent Application No. 2009-539092 (Statement of Relevance included), 3 total pages.

Office Action dated Feb. 25, 2014, from corresponding Japanese Patent Application No. 2009-539092 (Statement of Relevance attached), 10 pages total.

* cited by examiner

INFORMATION PROCESSING APPARATUS

CROSS REFERENCE TO RELATED APPLICATION

This application is a U.S. National Phase application of International Application No. PCT/JP2008/069655 (filed on Oct. 29, 2008), which claims priority to and the benefit of Japanese Patent Application No. 2007-282388 (filed on Oct. 30, 2007), the entire contents of which are incorporated herein by reference.

TECHNICAL FIELD

The present invention relates to information processing apparatus, and more particularly, to information processing apparatus capable of copying digital broadcast content, which can be copied up to a restricted number of times, together with information on the restricted number of times to an external recording medium and recording the content on the external recording medium so as to be reproduced by CPRM-compliant device.

BACKGROUND ART

Current digital broadcasting system adopts a copyright protection scheme, so-called "copy-once", which does not permit copying a broadcast program recorded on a digital recording device to another digital recording device while leaving the original broadcast program. For the digital broadcasting, since quality and speed of copy are improved more than those of analogue broadcasting, unauthorized copies or so-called pirated copies of the broadcast program can be easily generated. The above copyright protection system is based on a viewpoint that a need exists for a stronger copyright protection structure. Currently, CPRM (Content Protection for Recordable Media) is employed as the copyright protection scheme which achieves the copy-once. A CPRM-compliant recording medium stores MKB (Media Key Block) and a media ID unique to the recording medium. The content is stored in the CPRM-compliant recording medium after being encrypted using MKB, a media key generated using a device key unique to the recording device, and a media ID. When the content is copied from the CPRM-compliant recording medium to another recording medium by a CPRM-noncompliant device, encrypted data themselves can be recorded, while MKB and the media ID cannot be copied. Accordingly, there is no MKB necessary to decrypt the encrypted data and thus the media key cannot be generated to reproduce the content in the another recording medium. Alternatively, the media key generated is different because of different MKB and, as a result, the encrypted data cannot be decrypted properly and the content cannot be reproduced, which precludes making a copy of the content.

In the existing terrestrial digital broadcasting, a program is broadcasted after a copy control signal indicating the copy-once is added thereto. Accordingly, in order to record (time-shift) the digital broadcast program, it is necessary to use a recording device and a recording medium that are CPRM-compliant. In addition, when the broadcast program of copy-once is recorded, the broadcast program cannot be copied to another (CPRM-noncompliant) digital device or recording medium as described above, and the content recorded on the recording medium can be reproduced only by CPRM-compliant reproduction device. In a copy-once system, when a user transfers the broadcast program content recorded by a recording device to the recording medium such as a DVD, the content is not "copied" but "moved" erasing the broadcast program (original data) stored in the recording device. If this movement of the content is failed, neither the original data nor the data in the recording medium can be used. Therefore, the existing copy-once system is inconvenient for legitimate purchasers of program content who have no intention of making an unauthorized copy, that is, for good users.

In order to deal with such a problem of the copy-once, there is a conventional art suggesting a technique which provides a digital broadcast program which "can be copied a certain number of times" instead of the "copy-once", that is, the content can be copied up to the certain number of times. Patent Document 1, for example, suggests a method to provide a copy history table encrypted in an external recording medium or a memory in the information processing apparatus (recording device or copying device) for recording the content and update entry in the table in accordance with the number of copies of the content, which is permitted to be copied up to the certain number of times. In addition, Patent Document 2, for example, suggests to restrict the number of apparatus which can make a copy and the number of copies that can be made by recording a device ID, the number of apparatus which can make a copy and a maximum number of copies that can be made in a subsidiary recording section of the recording medium.

However, the existing CPRM-compliant device and CPRM-compliant recording medium are not provided with a format permitting an arbitrary number of copies to be made. Therefore, when the digital broadcast is received including copy control information that indicates "copying is permitted up to 3 times", for example, and directly recorded in the CPRM-compliant recording medium (an SD memory card and the likes) instead of an internal memory of the recording device, the information that indicates "copying is permitted up to 3 times", that is, a right to copy the content up to 3 times is lost. Since the copy apparatus disclosed in Patent Document 1 records the number of copies that can be made together with the content on the external recording medium or the memory, it solves the above problem to lose the information on the number of times. However, when the content recorded on a recording medium is moved to another recording medium using a device which does not recognize the format of the copy apparatus disclosed in Patent Document 1, the information on the number of copies that can be made is not recognized by the device and lost in the end. Although the copy apparatus disclosed in Patent Document 1 is capable of storing the content and the information on the number of copies that can be made in the memory of the copy apparatus, it is necessary to move the content to the external recording medium when the apparatus is replaced, which causes the same problem as described above. The information processing apparatus disclosed in Patent Document 2 has a similar problem that the content copied using a device which does not recognize the format of the information processing apparatus cannot be reproduced by the CPRM-compliant device.

In addition, if the arbitrary number of copies is permitted to be made, it may lead unauthorized copies or so-called pirated copies of the broadcast program by a person other than the legitimate user of the content, as mentioned at the beginning. Accordingly, there exists a need for the copyright protection system which prevents a right to copy from being passed to a third party other than the legitimate user of the content.

Patent Document 1: Japanese Patent Application Laid-Open No. 2001-351322

Patent Document 2: Japanese Patent Application Laid-Open No. 2005-190548

SUMMARY OF INVENTION

Technical Problem

Accordingly, it is an object of the present invention to provide a technique (an information processing apparatus) capable of copying program content of digital broadcasting, which can be copied up to a restricted number of times, without losing information on the number of times such that the program content can be reproduced by a conventional CPRM-compliant device and, moreover, preventing the program content from being copied by a third party other than a legitimate user of the program content.

Solution to Problem

In order to solve the above problems, an information processing apparatus of the present invention includes a memory unit for storing digital broadcast content for which a number of copies that can be made is set; a writing unit for writing the content stored in the memory unit on an external recording medium; an IC medium reader/writer for reading an IC medium and recording the number of copies that can be made of the content stored in the memory unit on the IC medium in association with an identifier of the content; and a control unit for determining whether an identifier of the content stored in the memory unit is recorded on the IC medium when the content is copied to the external recording medium and, when it is determined that the identifier of the content is recorded on the IC medium, controlling the writing unit to write the content on the external recording medium in accordance with the number of copies that can be made recorded in association with the identifier of the content, as well as controlling the IC medium reader/writer to update the number of copies that can be made of the content. When the information processing apparatus is a cellular phone terminal, it is preferred to use a SIM card as the IC medium. In addition, when the number of copies that can be made is zero, the control unit controls the writing unit to write the content on the external recording medium and also the memory unit to erase the content from the memory unit.

Moreover, in the information processing apparatus according to one embodiment of the present invention, the control unit, when it is determined that the identifier of the content stored in the memory unit is not recorded on the IC medium, controls the writing unit to prohibit copying the content to the external recording medium.

The information processing apparatus according to another embodiment of the present invention, the control unit, when the IC medium reader/writer cannot read the IC medium, controls the writing unit to prohibit copying the content stored in the memory unit to the external recording medium.

The information processing apparatus according to yet another embodiment of the present invention, the IC medium reader/writer records the number of copies that can be made of the content stored in the memory unit on the IC medium in association with a hash value of the content, and the control unit calculates a hash value of the content stored in the memory unit when the content is copied to the external recording medium, determines whether the hash value calculated is recorded on the IC medium and, when it is determined that the hash value calculated is recorded on the IC medium, controls the writing unit to write the content on the external recording medium, as well as controlling the IC medium reader/writer to update the number of copies that can be made recorded in association with the hash value of the content and record an updated number on the IC medium.

In the information processing apparatus according to yet another embodiment of the present invention, the control unit controls the writing unit to prohibit copying the content to the external recording medium when it is determined that the hash value calculated is not recorded on the IC medium.

It is to be noted that the above "prohibit copying" includes a process of the control unit to control the wiring unit to write the content on the external recording medium and to control the memory unit to erase the content from the memory unit.

ADVANTAGEOUS EFFECTS ON INVENTION

According to the present invention, it is possible to provide an information processing apparatus having a good usability and capable of copying program content of digital broadcasting having a restricted number of copies to be made on the recording medium without losing information on the number of copies such that the program content can be reproduced by a conventional CPRM-compliant device and, moreover, protecting the copyright strongly by preventing the program content from being copied by the third party other than a legitimate user of the program content.

REFERENCE SIGNS LIST

Figure 1:
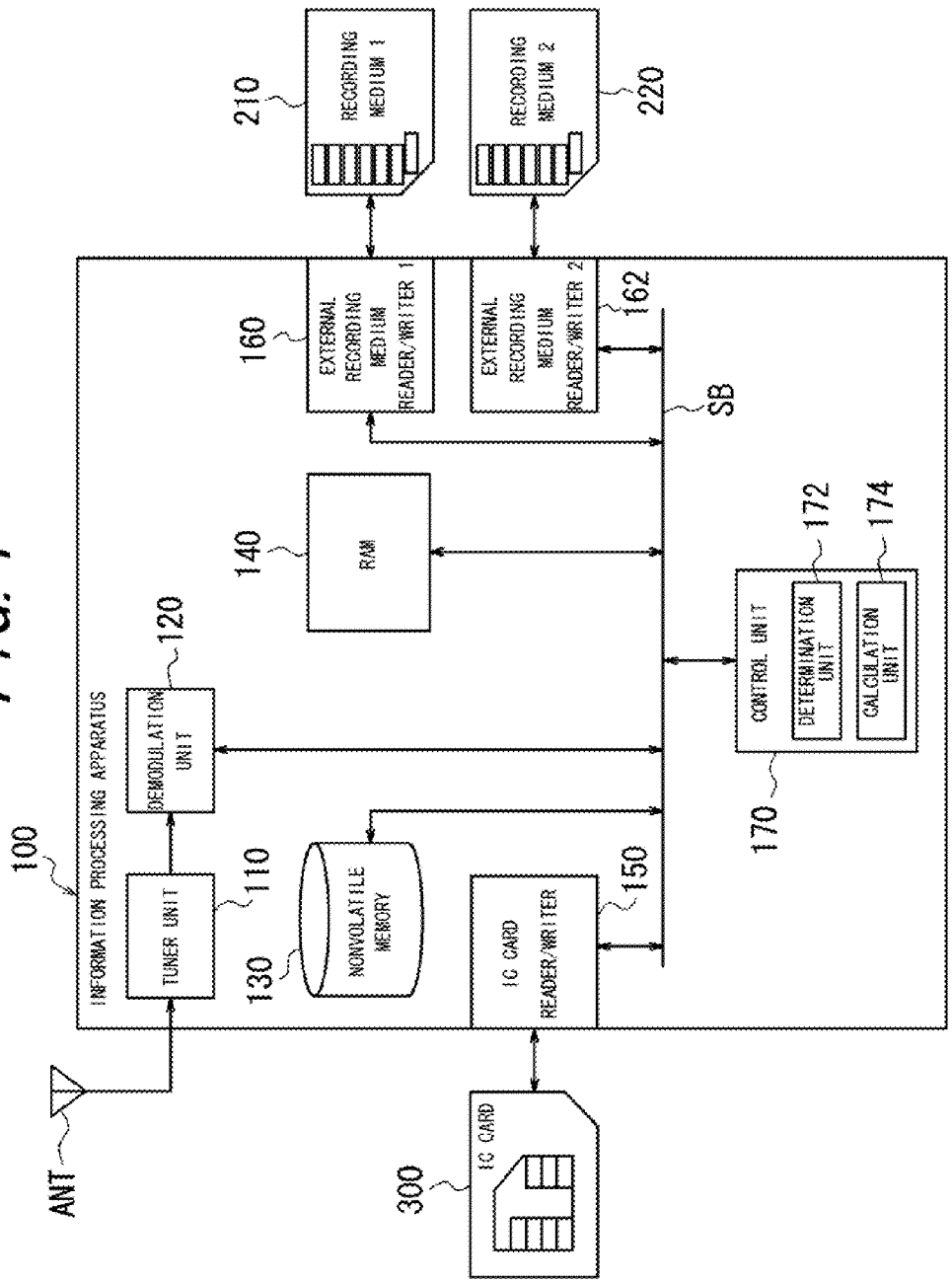
FIG. 1 is a schematic block diagram of an information processing apparatus of the present invention.

100 information processing apparatus
110 tuner unit
120 demodulation unit
130 nonvolatile memory 140 RAM
150 IC card reader/writer
160, 162 external recording medium reader/writer
170 control unit
172 determination unit
174 calculation unit
210, 220 recording medium
300 IC card
310 table of the number of copies that can be made
ANT antenna
SB system bus
D1, D2 TS data

DESCRIPTION OF EMBODIMENTS

Embodiments of the present invention will be described with reference to the accompanying drawings. FIG. 1 is a schematic block diagram of an information processing apparatus according to one embodiment of the present invention. As shown in the figure, an information processing apparatus 100 is provided with an antenna ANT, a tuber unit 110, a demodulation unit 120, a nonvolatile memory 130, a RAM (Random Access Memory) 140, an IC card reader/writer 150, external recording medium readers/writers 160, 162, a control unit 170 and a system bus SB. The control unit 170 is provided with a determination unit 172 and a calculation unit 174. A cellular phone terminal is adopted as a typical example of the information processing apparatus 100 in FIG. 1 and a description below. However, the information processing apparatus of the present invention is widely applicable not only to mobile communication terminals such as a PDA (Personal Digital Assistance) but to portable electronic devices such as a portable game player, a portable video player, a portable electronic book viewer, and the likes. In addition, One Seg broadcasting is used as the terrestrial digital broadcasting in the description. In the following description, all of an "external recording medium", an "external medium" and a "recording medium" mean a CPRM-compliant recording medium such as an SD memory card or a CPRM-compliant HDD. Moreover, an "IC card" is adopted as the typical example of an "IC medium".

A function of each unit of the information processing apparatus 100 is described in detail. The information processing unit 100 receives an RF signal of a digital broadcast with the antenna ANT. The RF signal received is tuned by the tuber unit 101 based on a frequency (channel) designation command from the control unit 170 which controls the entire apparatus. A channel signal to which frequency conversion is performed by the tuber unit 110 is demodulated into a TS signal of MPEG by the demodulation unit 120. Data (video data, audio data and the likes) of program content included in the TS signal is recorded (stored) in the nonvolatile memory 130 (an internal memory). Alternatively, the above data are recorded on recording media 210, 220 by the external recording medium readers/writers 160, 162. Here, it is assumed that the recording media 210, 220 are the SD memory cards and the likes, for example, which are CPRM-compliant Although only one of the external recording medium readers/writers 160, 162 may be provided, a plurality of external recording medium readers/writers enables the content to be copied (duplicated) between external recording media.

The determination unit 172 determines copy control information on the program content included in the TS signal demodulated by the demodulation unit 120. The copy control information is information indicating whether the program content including the copy control information is encrypted as "copy-never", "multiple copies that can be made" or "copy-once". The information is distinguished by a flag of copy control information named CCI (Copy Control Information) of the digital broadcast signal, for example. Alternatively, the information may be provided by allocating a flag in a content availability descriptor to a reserved extended area. In addition, the determination unit 172 determines whether an IC card, which will be described below, is inserted into the IC card reader/writer 150, and whether recording of the program content is permitted when the IC card is not inserted by analyzing the information included in the TS signal demodulated by the demodulation unit 120.

The IC card reader/writer 150 reads/writes the IC card 300. When the copy control information included in the TS signal indicates that "multiple copies can be made" based on a result of the determination on information of the TS signal by the determination unit 172, the control unit 170 controls the IC card reader/writer 150 to write the number of copies that can be made (copy permission number) on the IC card 300. The calculation unit 174 calculates a hash value from the data of the program content included in the TS signal demodulated by the demodulation unit 120. The determination unit 172 determines whether the hash value calculated by the calculation unit 174 is coincident with a hash value included in the IC card 300. Based on a result of determination by the determination unit 172, the control unit 170 controls the external recording medium readers/writers 160, 162 to encrypt the program content and write the program content on the recording media 210, 220. In addition, the control unit 170 controls the IC card reader/writer 150 to update the number of copies that can be made contained in the IC card 300 in accordance with the number of times of copy (duplication times) of the program content. Here, in a case where the information processing apparatus 100 is the cellular phone terminal, it is preferred to use SIM (Subscriber Identity Module) as the IC card 300. The SIM card is an IC card having subscriber information recorded thereon issued by each cellular phone carrier and used for identification of the subscriber. A user can use functions (incoming and outgoing call and the likes) of the cellular phone terminal by inserting the SIM card into the cellular phone terminal. An advantage by using the SIM card as the IC card will be described below.

Figure 2:
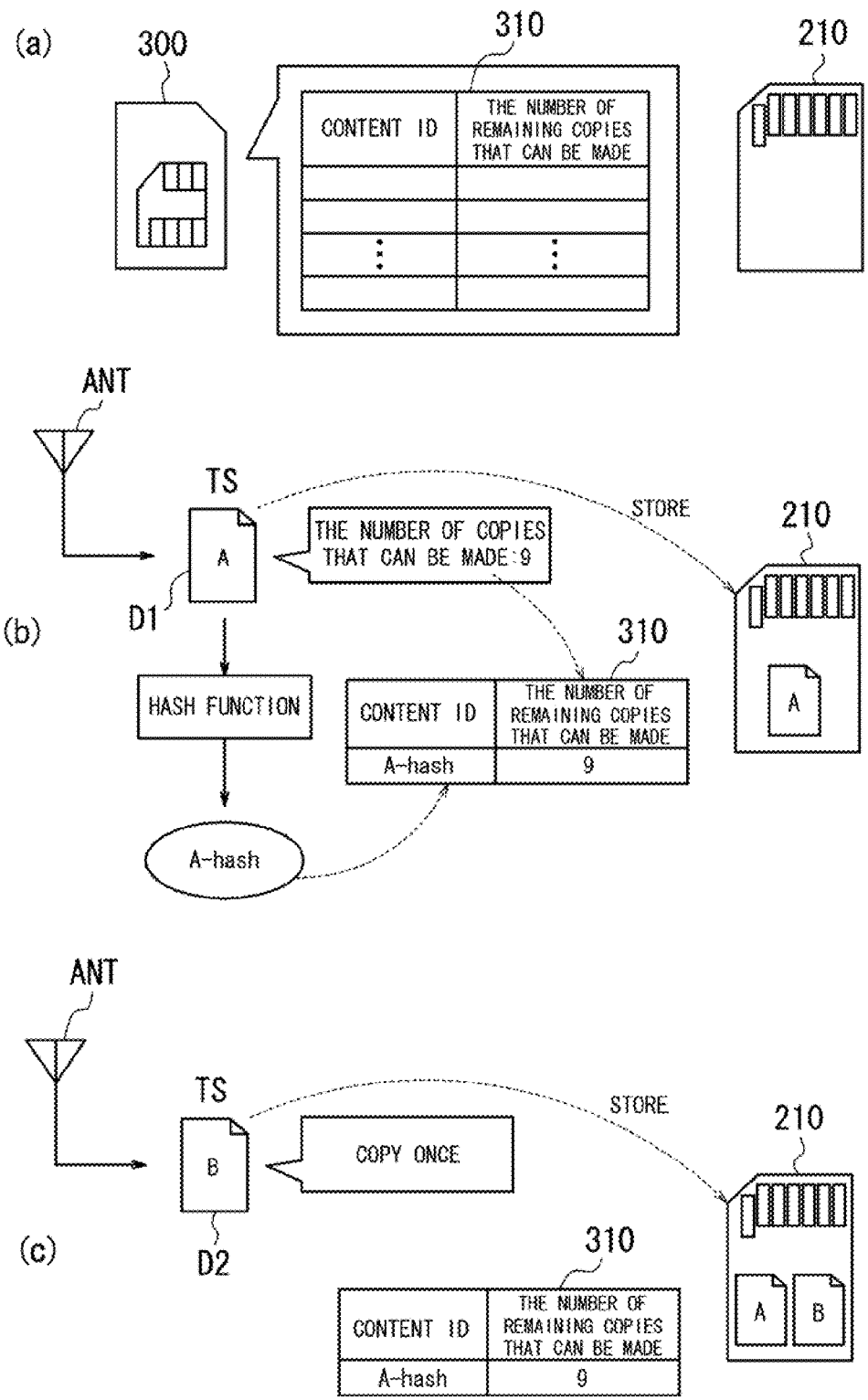
FIG. 2 is schematic diagrams of recording process of program content of the digital broadcasting by an information processing apparatus 100.

A recording process of the program content of the digital broadcast by the information processing apparatus 100 shown in FIG. 1 will be described with reference to drawings. FIG. 2 shows schematic diagrams of the recording process of the program content of the digital broadcast by the information processing apparatus 100. In this example, the IC card 300 and the recording medium 210 are inserted into the information processing apparatus 100. Accordingly, data of the program content received by the information processing apparatus 100 are recorded on the recording medium 210.

FIG. 2(a) is a diagram illustrating the IC card 300 and the recording medium 210, which are blank. The IC card 300 includes a table of the number of copies that can be made 310. The table of the number of copies that can be made 310 stores an identifier of program content (content ID) that the user of the IC card 300 has a right to copy, and a number (a number of remaining copies that can be made) to be able to copy the program content hereafter. When there is nothing recorded, the table of the number of copies that can be made 310 is blank as shown in the figure.

FIG. 2(b) is a schematic diagram illustrating a processing in a case where the TS (Transport Stream) signal including program content which can be copied multiple times is received by the antenna ANT. The figure exemplifies a case where the antenna ANT receives TS data D1 of content A, which can be copied nine times. When the antenna ANT receives the TS signal, the determination unit 172 determines copy control information of the program content included in the TS signal. In this example, the copy control information indicates that "the number of copies that can be made is nine". Accordingly, the calculation unit 174 calculates the hash value from the program content by use of a known hash function (in the example shown in the figure, the hash value is A-hash). Based on a determination by the determination unit 172, the control unit 170 controls the IC card reader/writer 150 to record nine as the number of copies that can be made in the table of the number of copies that can be made 310 in the IC card 300. Also, the control unit 170 controls the IC card reader/writer 150 to record the A-hash calculated by the calculation unit 174 as the content ID. Simultaneously, the control unit 170 controls the external recording medium reader/writer 160 to write the TS data D1 of the content A received on the recording medium 210. The TS data D1 is encrypted with a media ID and a media key of the recording medium 210 by the CPRM method before being recorded on the recording medium 210.

FIG. 2(c) is a schematic diagram of a processing when a TS signal containing content B of copy-once is received after a condition shown in FIG. 2(b). First, when the antenna ANT receives the TS signal, the determination unit 172 determines that TS data D2 of content B included in the TS signal is copy-once. Then, the control unit 170 controls the external recording medium reader/writer 160 to write the TS data D2 of the content B on the recording medium 210. In this case also, the TS data D2 of the content B is encrypted with the media ID and the media key of the recording medium 210 by the CPRM method before being recorded on the recording medium 210. Since the TS data D2 is copy-once here, no information is newly written in the table of the number of copies that can be made 310, and only the information on the content A is stored.

Figure 3:
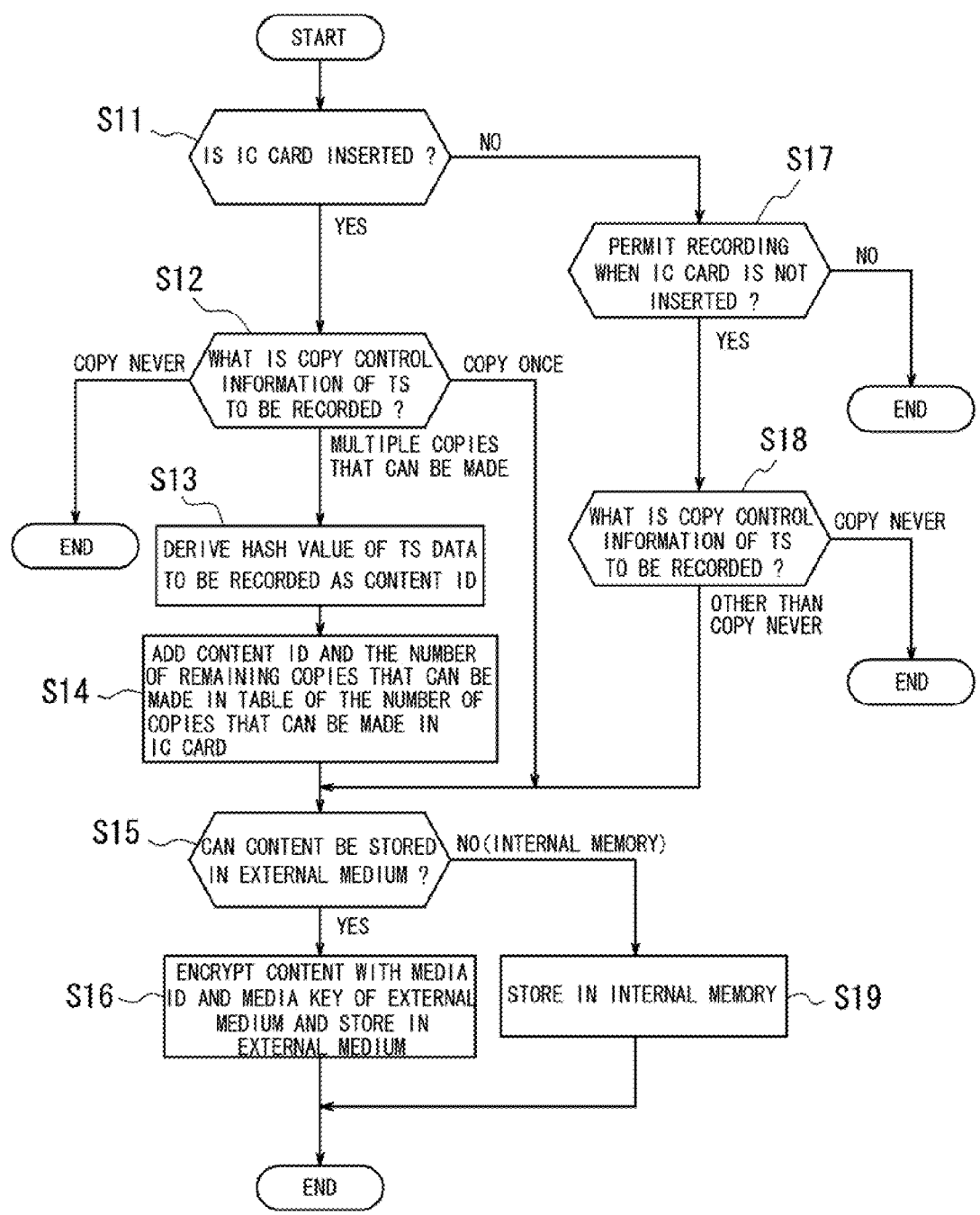
FIG. 3 is a flow chart of the recording process by the information processing apparatus 100.

The recording process by the information processing apparatus 100 shown in FIG. 1 will be described with reference to a flow chart. FIG. 3 is a flow chart of an example of a recording process of the information processing apparatus 100. The information processing apparatus 100 starts recording the digital broadcast by a trigger such as an operation of an input unit (not shown) by the user or a preset recording program, for example. When the digital broadcast is received by the antenna ANT, the determination unit 172 determines whether the IC card is inserted in the IC card reader/writer 150, at step S11. When it is determined that the IC card is not inserted, the process proceeds to step S17, where the determination unit 172 determines whether recording is permitted when the IC card is not inserted, based on the information included in the TS signal of the digital broadcast being received. The information on whether recording is permitted when the IC card is not inserted may be defined in advance as a specification of the information processing apparatus 100. Alternatively, it is also possible for a provider of the program content to optionally include the information on whether recording is permitted when the IC card is not inserted in a broadcasting signal to be transmitted. When it is determined that recording is not permitted when the IC card is not inserted at step S17, the recording process is ended. When it is determined that the recording is permitted, the process proceeds to step S18, where the determination unit 172 determines the copy control information included in the TS signal to be recorded. When the copy control information indicates "copy-never", the control unit 170 ends the recording process. When the copy control information indicates one other than "copy-never", the process proceeds to step S15.

When it is determined that the IC card is inserted at step S11, the process proceeds to step S12, where the determination unit 172 determines the copy control information included in the TS signal of the digital broadcast being received. When the copy control information is "copy-never", the control unit 170 ends the recording process, while the process proceeds to step S15 when the copy control information is "copy-once". When the copy control information is "multiple copies that can be made", the process proceeds to step S13, where the calculation unit 174 calculates the hash value from the data of the program content as the content ID of the program content to be recorded. Then, at step S14, the control unit 170 controls the IC card reader/writer 150 to write the hash value calculated by the calculation unit 174 and the number of copies that can be made of the program content to be recorded in the table of the number of copies that can be made 310 in the IC card 300.

At step S15, the determination unit 172 determines whether the program content being received can be stored in an external recording medium, that is, whether the program content being received can be recorded, based on the information included in the program content. This information can also be optionally set by the provider of the program content, namely, a content holder. When it is determined that the program content cannot be recorded (not permitted) on the external recording medium, the process proceeds to step S19, where the program content being received is stored in the internal memory (nonvolatile memory 130) in accordance with a format thereof. When it is determined that the program content can be recorded (permitted) on the external recording medium, the program content is encrypted using the media ID and the media key of the external recording medium in accordance with the CPRM method and then stored (recorded) on the external recording medium.

It may occur that the number of copies that can be made of the program content is changed by a content producer during recording of the program content. In such a case, the information processing apparatus 100 ends recording of the content being recorded and newly starts recording the content with a changed number of copies that can be made as another content. Moreover, it may also occur that, although the calculation unit 174 calculates the hash value when the program content for which the number of copies that can be made has been set is recorded, it is not possible to previously know a length of the program content to be recorded. In such a case, the control unit 170 records the content on the recording medium or the internal memory while the calculation unit 174 calculates the hash value of the content to be recorded. When recording of the program content is completed, the calculation unit 174 can store the hash value calculated in the IC card.

As described above, the recording process of the present invention records the program content on the external recording medium in accordance with the CPRM method. Accordingly, the external recording medium having the program content recorded by the information processing apparatus 100 of the present invention can reproduce the program content by use of the CPRM-compliant device.

Figure 4:
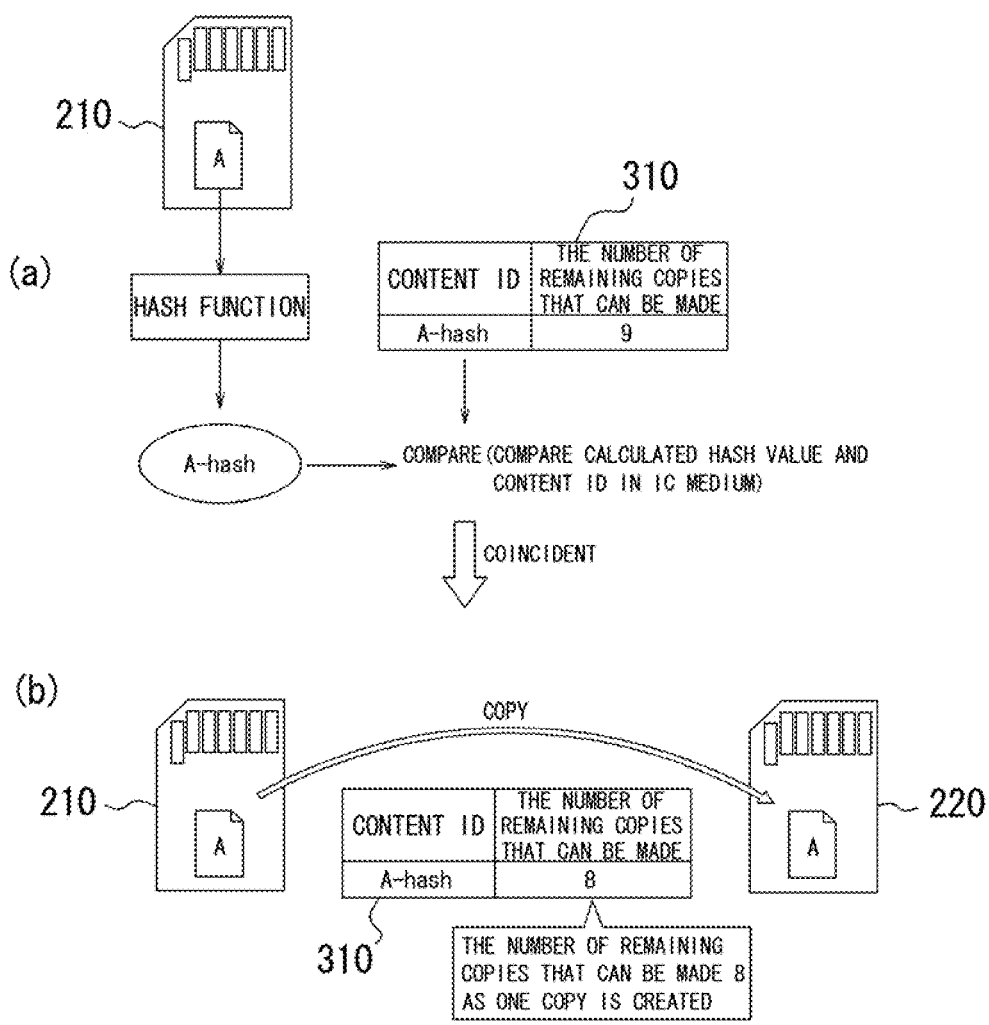
FIG. 4 is schematic diagrams illustrating an operation of the information processing apparatus 100 and a change in a table of the number of copies that can be made 310 when content which can be copied multiple times is copied from an external recording medium onto another external recording medium.

Next, it is described about a case where the content which can be copied multiple times and is recorded on the external recording medium is copied onto another external recording medium by use of the information processing apparatus 100 of the present invention. FIG. 4 is schematic views illustrating an operation of the information processing apparatus 100 and a change in the table of the number of copies that can be made 310 when the content which can be copied multiple times is copied from the external medium 210 to another external medium 220. As shown in FIG. 4(a), the external recording medium reader/writer 160 decrypts the content A recorded on the external recording medium 210 using the media ID and the media key and then read out the content A. Next, the calculation unit 174 calculates a hash value A-hash from the content A read out. The determination unit 172 compares the hash value calculated by the calculation unit 172 and the content ID stored in the table of the number of copies that can be made in the IC card 300. In a case where there is a content ID stored corresponding to the hash value calculated, the control unit 170 regards that the content A recorded on the external recording medium 210 is not an unauthorized copy not by the CPRM method. Alternatively, the control unit 170 regards the user of the information processing apparatus 100 as the one with a right to copy the content A recorded on the external recording medium 210. Then, the control unit 170 controls the external recording medium reader/writer 162 to copy the content recorded on the external recording medium 210 on the external recording medium 220, as shown in FIG. 4(b). At this time, the content A is CPRM encrypted using the media key and the media ID and then written on the external recording medium 220. Simultaneously, the control unit 170 controls the IC card reader/writer 150 to rewrite the number of remaining copies that can be made as a number decreased by one in the table of the number of copies that can be made 310, as the content A is copied once.

Figure 5:
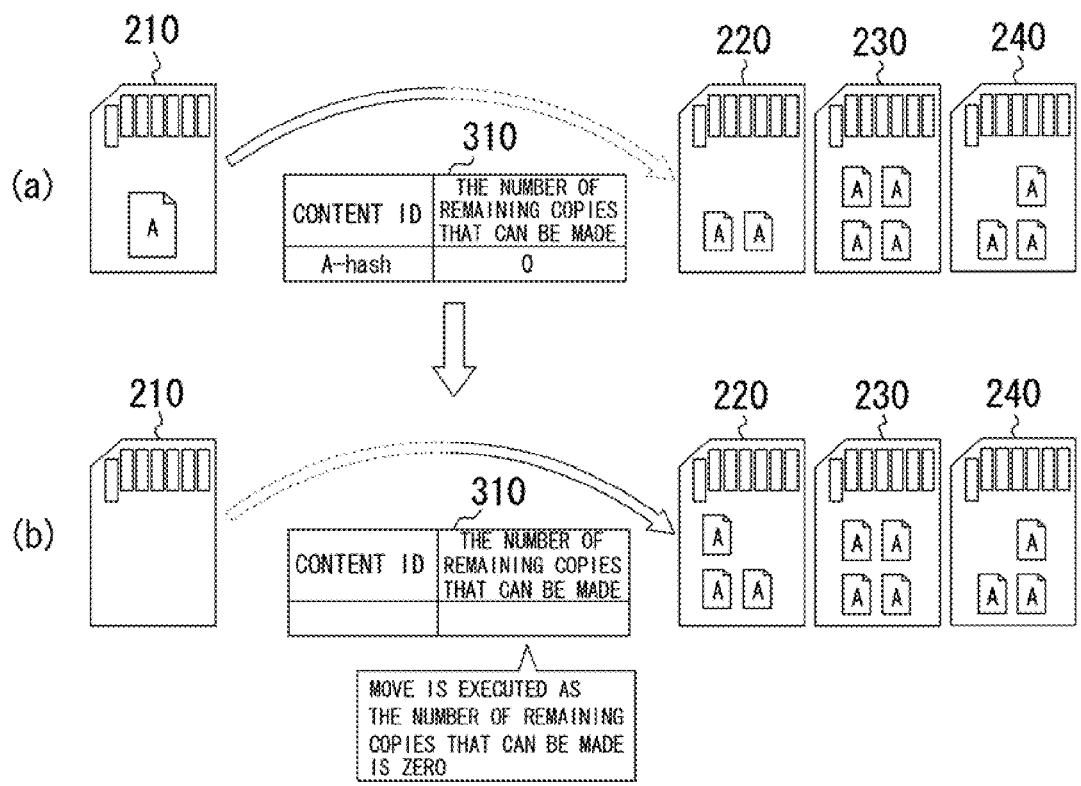
FIG. 5 is diagrams illustrating handling of the content by the information processing apparatus 100 after the content is copied up to the number of copies that can be made.

FIG. 5 shows diagrams illustrating how the content A is handled by the information processing apparatus 100 after the content A is copied up to the number of copies that can be made. FIG. 5(a) shows a state where the number of remaining copies that can be made is zero in the table of the number of copies that can be made 310 after the content A is further copied from the external recording medium 210 to another external recording medium after a state shown in FIG. 4. In the state shown in FIG. 5(a), nine contents A are distributed to three external recording media 220, 230, 240. When the user tries to further copy the content A recorded on the external recording medium 210 on the external recording medium 220, since the number of remaining copies that can be made in the table of the number of copies that can be made 310 is zero, the determination unit 172 regards that the content A recorded on the external recording medium 210 cannot be copied. Accordingly, the content A recorded on the external recording medium 210 is not copied but moved to the external recording medium 220. Thus, the content recorded on the external recording medium 210 is erased, together with the information on the content A (content ID and the number of remaining copies that can be made) in the table of the number of copies that can be made 310. Although the content A is distributed to three external recording media 220, 230, 240 in the figure, it is possible to have a single external recording medium with nine contents A. It is also possible to have nine external recording media each of which has the content A.

Figure 6:
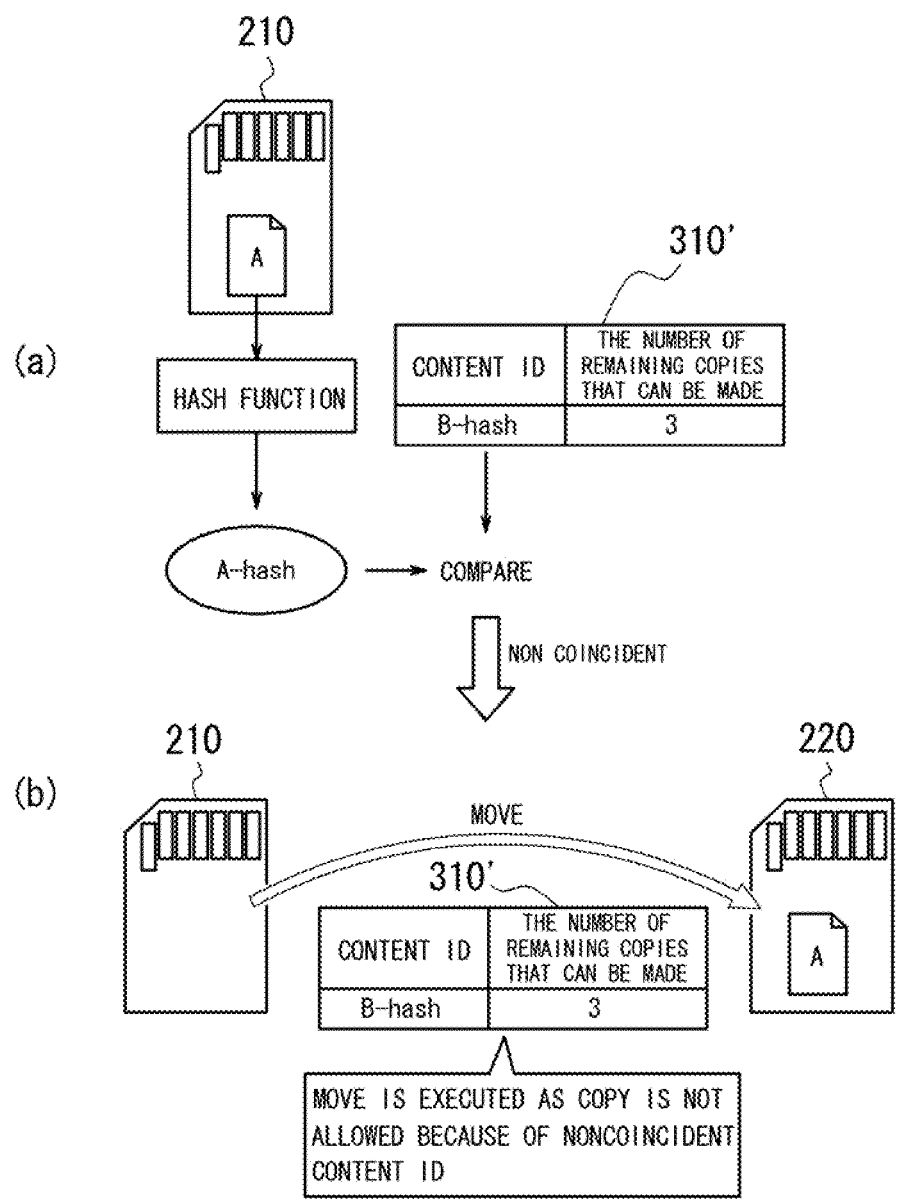
FIG. 6 is diagrams illustrating a processing of the information reception apparatus 100 when a user having no authority to copy the content stored in the recording medium tries to copy the content to another recording medium.

In addition, it may occur that the recording medium having the program contents recorded thereon is passed to a user who has no right to copy the program content, without a legitimate user's intention having the right to copy the program contents. In such a case, since the program content will not be copied by the information processing apparatus 100 without a legitimate user's intention, it can strongly protect a copyright. This structure is described with reference to drawings. FIG. 6 is diagrams of a processing of the information processing apparatus of the present invention in a case where a user unauthorized to copy the content A recorded on the recording medium 210 tries to copy the content A to the recording medium 220 by use of the information processing apparatus of the unauthorized user. Here, the information processing apparatus and its units of the user having no right to copy the content A will be given reference signs with a prime symbol "'".

First, an external recording medium reader/writer 160' of an information processing apparatus 100' decrypts the content A encrypted and recorded on the recording medium 210 by use of the media ID and the media key of the recording medium 210 in accordance with the CPRM method. Since the information processing apparatus 100' and the recording medium 210 comply with the CPRM method, the content A can be decrypted properly. Then, a calculation unit 174' of the information processing apparatus 100' calculates the hash value A-hash from the content A decrypted. A determination unit 172' then compares the hash value calculated and the content ID stored in a table of the number of copies that can be made 310' in an IC card 300' of the user of the information processing apparatus 100'. The user of the information processing apparatus 100' does not have the right to copy the content A, namely, the IC card which should be held by the user having the right to copy the content A. Therefore, the content ID (for example, a B-hash in an example shown in the figure) stored in the table of the number of copies that can be made 310' of the IC card 300' of the user of the information processing apparatus 100' differs from the hash value A-hash calculated by the calculation unit 174'. That is, no content ID corresponding to the hash value A-hash calculated is stored in the table of the number of copies that can be made 310'. A control unit 170' thus controls the external recording medium reader/writer 160' not to "copy" but to "move" the content A recorded on the recording medium 210.

As set forth above, according to the information processing apparatus of the present invention, since the content can be copied only by the legitimate user having the right to copy, it can protect the copyright strongly. The following is an advantage to use the SIM card as the IC card when the information processing apparatus 100 is a cellular phone terminal. As described above, the SIM card stores the information on the subscriber, and a number of functions (outgoing/incoming call, mail transmission/reception and the likes) of the cellular phone terminal are restricted significantly without the card. Therefore, the subscriber carefully handles the SIM card, and thus it hardly happens that the SIM card together with the recording medium is passed to the third party. As a result, it is possible to prevent the content from being copied by the third party without the legitimate user's intension.

Figure 7:
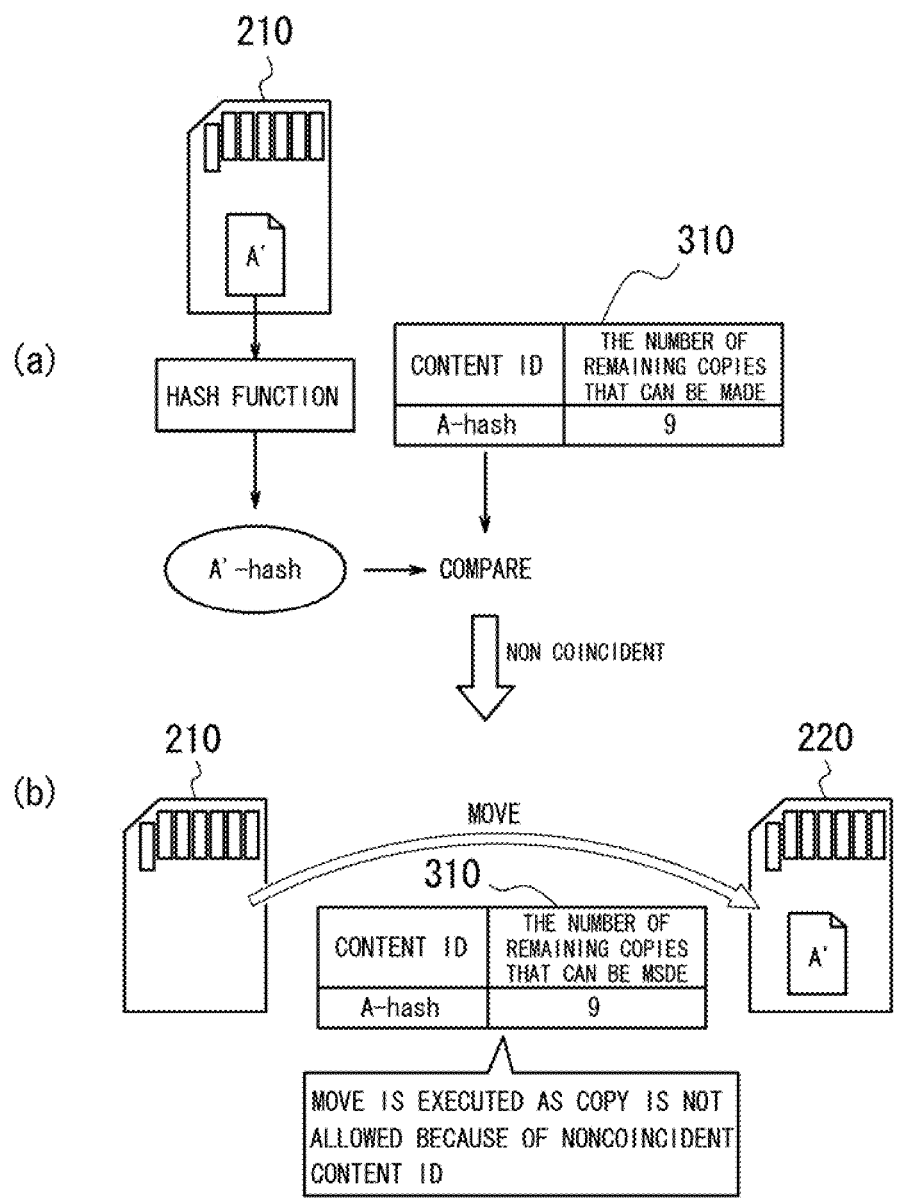
FIG. 7 is diagrams illustrating a case where it is attempted using the information processing apparatus 100 to copy the recording medium including fraudulently copied content by a CPRM-noncompliant device.

The following is a description about a processing of the information processing apparatus in a case where the content A is fraudulently copied using a CPRM-noncompliant device and it is attempted to copy the content, which is fraudulently copied, using the information processing apparatus of the present invention. FIG. 7 is a diagram illustrating a case where it is attempted to copy the recording medium 210 including content A' which is fraudulently copied by the CPRM-noncompliant device using the information processing apparatus 100. The external recording medium reader/writer 160 decrypts and then reads out the content A' of a fraudulent copy recorded on the external recording medium 210. Then, the calculation unit 174 calculates the hash value from the content A' read out. Since being the fraudulent copy, the content A' does not include the media ID, which has been used to encrypt the legitimate content A, in accordance with a standard of the CPRM technology. Accordingly, data of the content A' decrypted differs from the data of the content A properly decrypted, and the hash value calculated using the data of the content A' decrypted is A'-hash, for example. That is, there is no content ID corresponding to the A'-hash in the table of the number of copies that can be made 310. Therefore, the control unit 170 controls the external recording medium reader/writer 160 not to "copy" but to "move" the content A' recorded on the recording medium 210. It is to be noted that the content cannot be moved if the external medium 210 is not writable. Although it may occur that the content A' of the fraudulent copy is moved to the recording medium 220, there is no problem in movement thereof, as the content A' is not compliant to the CPRM method and thus cannot be reproduced by the CPRM-compliant device. In addition, by taking a large bit number, the hash function for obtaining the hash value can reduce a probability of a conflict of the hash value to an extent not causing a practical problem. Accordingly, when the hash value does not correspond to the content ID by comparison of the hash value calculated by the calculation unit and the content ID, the content can be uniquely regarded as the fraudulent copy.

Figure 8:
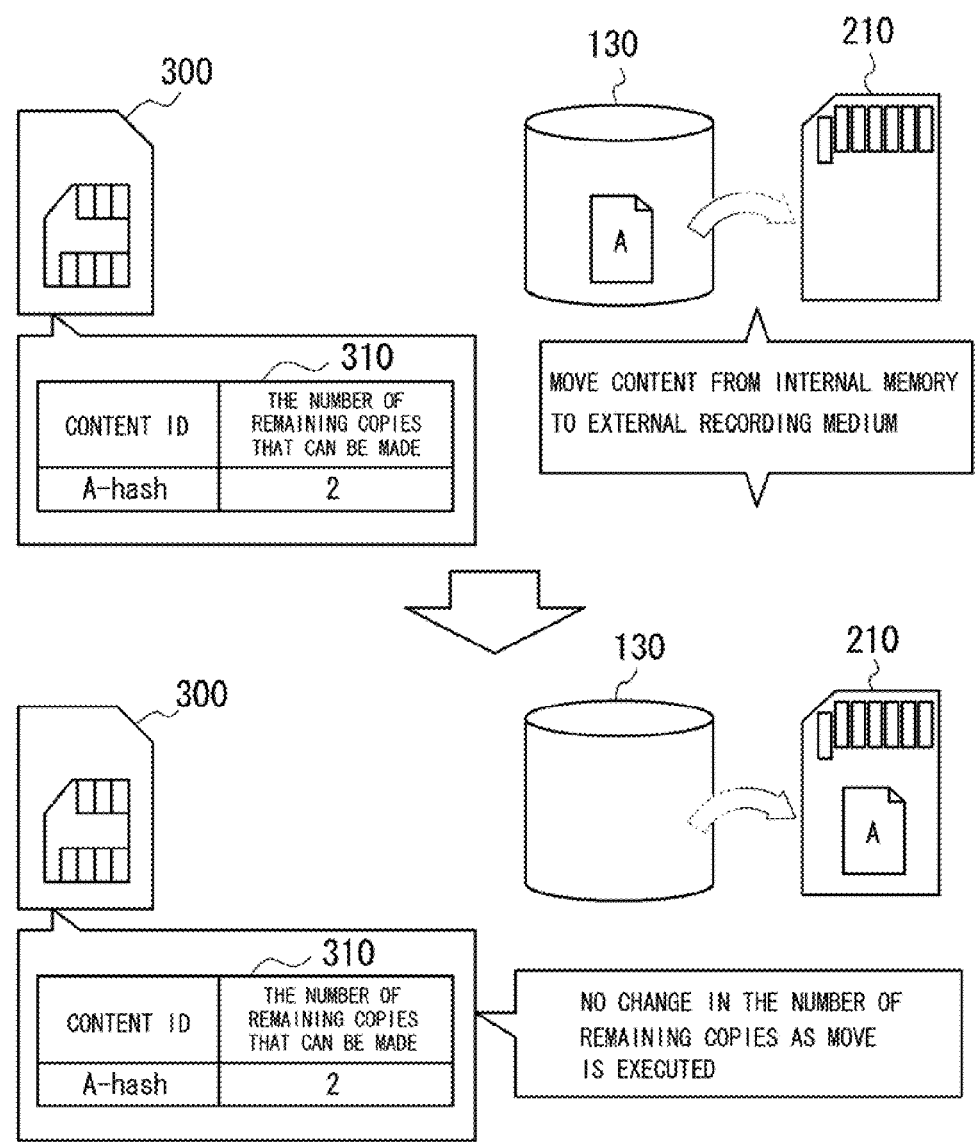
FIG. 8 is a diagram illustrating a processing of the information processing apparatus 100 of the present invention when the content is moved from an internal memory to the external recording medium.

It may also be considered a case where the program content received is once stored in the internal memory of the information processing apparatus 100 and then transferred (moved) onto the external recording medium. FIG. 8 is a diagram illustrating a processing of the information processing apparatus 100 of the present invention in a case where the content is moved from the internal memory to the external recording medium. As shown in an upper half of the figure, the content A stored in the nonvolatile memory (internal memory) 130 has two as the number of copies that can be made and the hash value A-hash calculated by the calculation unit 174 as the content ID. Such information is stored in the table of the number of copies that can be made 310 in the IC card 300. In this state, the content A stored in the nonvolatile memory 130 is moved to the external recording medium 210. In such a case, data stored in the nonvolatile memory 130 are erased after being moved to the external recording medium 210, as shown in a lower half of the figure. Since the content is not copied, the information in the table of the number of copies that can be made 310 remains unchanged. This processing is applicable to a case where the content is moved between the external media.

Figure 9:
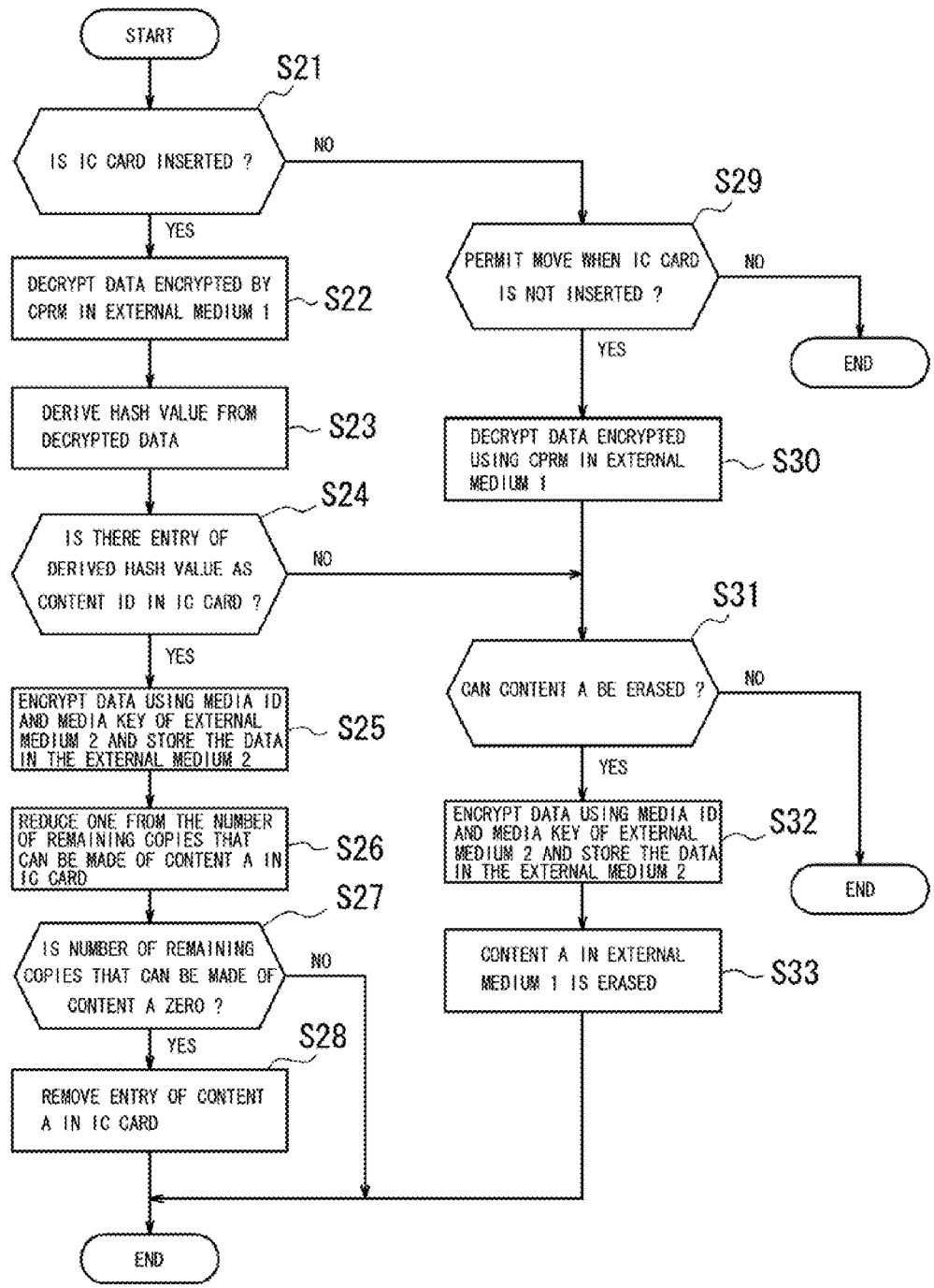
FIG. 9 is an example of a flow chart of a copy processing of content which can be copied multiple times.

The following is a description of a copying process for the content which can be copied multiple times by the information processing apparatus of the present invention described above, with reference to a flow chart. FIG. 9 is an example of a flow chart of the copying process of the content which can be copied the multiple times. The flow chart exemplifies a case where the content A is copied from an external recording medium (external medium) 1 to an external recording medium 2. The hash value obtained from the content A is used as the content ID as stated above.

The information processing apparatus 100 starts copying the content by the trigger such as an operation of the input unit (not shown) by the user, for example. First, the determination unit 172 determines whether the IC card is inserted in the IC card reader/writer 150, at step S21. When it is determined that the IC card is inserted, the control unit 170 controls the external recording medium reader/writer 160 to decrypt and read out the data of the content A which is CPRM encrypted and included in the external medium 1, at step S22. Then, the calculation unit 174 calculates the hash value from the data decrypted, at step S23. At step S24, the determination unit 172 determines whether there is an entry (stored) of the hash value calculated by the calculation unit as the content ID in the table of the number of copies that can be made 310 in the IC card 300. When it is determined that there is the entry, the process proceeds to step S25, where the control unit 170 controls the external recording medium reader/writer 162 to encrypt the content A using the media ID and the media key of the external medium 2 and write the content A on the external medium 2. Moreover, the control unit 170 controls the IC card reader/writer 150 to update the number of remaining copies that can be made by reducing one from the number in the table of the number of copies that can be made 310 in the IC card 300, at step S26. Subsequently, the determination unit 172 determines whether the number of remaining copies that can be made of the content A is zero, with reference to the table of the number of copies that can be made 310, at step S27. When it is determined that the number of remaining copies that can be made is not zero, the control unit 170 ends the copying process as it stands. When it is determined that the number of remaining copies that can be made is zero, the process proceeds to step S28, where the control unit 172 controls the IC card reader/writer to erase the entry of the content A in the table of the number of copies that can be made 310 in the IC card 300.

When it is determined that the IC card is not inserted at step S21, the process proceeds to step S29, where the determination unit 172 determines whether the content is permitted to move when the IC card is not inserted, based on the information included in the TS signal of the digital broadcast being received. Since it is not possible to determine whether the user of the information processing apparatus 100 is the legitimate user having the right to copy the content when the IC card is not inserted, it is preferred to permit not copying the content but moving the content only. Accordingly, in this flow chart, only moving is permitted, and it is determined whether to permit "moving", at step S29. The information on whether moving the content is permitted when the IC card is not inserted may be defined in advance as the specification of the information processing apparatus 100. Alternatively, it is also possible for the provider of the program content to optionally include the information in a broadcasting signal to be transmitted.

When it is determined at step S29 that moving is not permitted when the IC card is not inserted, the control unit 170 ends the copying process. When it is determined that moving is permitted, the process proceeds to step S30 where the control unit 170 controls the external recording medium reader/writer 160 to decrypt and read out content data which is CPRM encrypted and contained in the external medium 1. Next, the determination unit 172 determines whether the content A can be erased, that is, the external medium 1 having the content A recorded thereon is recordable, at step S31. When it is determined that the content A cannot be erased, the control unit 170 ends the process without moving the content between the external media. When it is determined that the content A can be erased, the process proceeds to step S32 where the control unit 170 controls the external recording medium reader/writer 162 to encrypt the content A using the media ID and the media key of the external medium 2 and write the content A on the external medium 2. Then, the control unit 170 controls the external recording medium reader/writer 160 to erase the content A recorded on the external medium 1, at step S33. In addition, when it is determined that there is no content ID stored corresponding to the hash value calculated at step 24, the process also proceeds to step 31 and, in accordance with steps thereafter, the content is processed not to "be copied" but to "be moved".

The advantages of the present invention are repeated here. According to the information processing apparatus of a conventional art, there is a problem that the information on the number of copies that can be made is lost when the digital broadcast content is recorded, even if the content can be copied multiple times. Although it is considered to store the number and the content in the apparatus to deal with the problem, the information is lost when the apparatus is replaced or damaged. According to the present invention, in contrast, since the number of copies that can be made is stored in the IC card which is removable from the information processing apparatus, the IC card can be mounted to another information processing apparatus when the information processing apparatus is replaced. Accordingly, it is the advantage that the legitimate user having the right to copy the content multiple times will not lose the right. In addition, by use of the SIM card as the IC card when the information processing apparatus is the cellular phone terminal, the functions of the cellular phone terminal without the SIM card are limited significantly. Accordingly, the user handles the SIM card very carefully, which reduces a chance for the SIM card to be handed to the third party, so that it is possible to reduce a chance of a fraudulent copy by the third party and protect the content strongly.

In addition, since the information processing apparatus of the present invention writes the content on the recording medium in accordance with the CPRM method, the content can be reproduced by the conventional CPRM-compliant device. Moreover, according to the present invention, the hash value calculated from the content itself is stored as the content identifier in the IC card. With an appropriate hash function obtained, the hash value hardly corresponds to another hash value calculated from different content, and thus the hash value can be the identifier unique to the content. Accordingly, even when the external recording medium in which the content is stored is different from the IC medium in which the identifier, which enables identification of the legitimate user of the content, is stored, it is possible to discern a correspondence between the media without fail. That is, by comparing the hash value calculated from the content stored in the external recording medium and the content identifier in the IC card of the user having the right to copy, it is possible to determine without a fail whether the user has the right to copy the content stored in the external recording medium (whether the user is the legitimate user of the content) and also whether the content is the fraudulent copy. Furthermore, the information processing apparatus of the present invention processes operations to copy a fraudulent copy of the content and to make a copy by the unauthorized user as "move". Therefore, the information processing apparatus has another advantage that the content cannot be copied a number of permitted times against the legitimate user's intension.

Although the present invention is described based on the drawings and the embodiments, it will be understood by those skilled in the art that variations and modifications can be easily implemented in a variety of manners using the teaching of the present invention. Accordingly, such variations and modification are intended to be included in the scope of the present invention. For example, functions included in the units can be rearranged not to contradictory logically, and a plurality of elements can be combined or divided.

The invention claimed is:

1. An information processing apparatus comprising:
a memory unit for storing digital broadcast content for which a number of copies that can be made is set;
a writing unit for writing the content stored in the memory unit on an external recording medium;
an IC medium reader/writer for reading an IC medium and recording the number of copies that can be made of the content stored in the memory unit on the IC medium in association with an identifier of the content, wherein the IC medium is separate from the memory unit and the external recording medium; and
a controller for determining whether an the identifier of the content stored in the memory unit is recorded on the IC medium when the content is copied to the external recording medium and, when it is determined that the identifier of the content is recorded on the IC medium, controlling the writing unit to write the content on the external recording medium in accordance with the number of copies that can be made recorded in association with the identifier of the content, as well as controlling the IC medium reader/writer to update the number of copies that can be made of the content.

2. The information processing apparatus according to claim 1, wherein the controller, when it is determined that the identifier of the content stored in the memory unit is not recorded on the IC medium, controls the writing unit to prohibit copying the content to the external recording medium.

3. The information processing apparatus according to claim 1, wherein the controller, when the IC medium reader/writer cannot read the IC medium, controls the writing unit to prohibit copying the content stored in the memory unit to the external recording medium.

4. The information processing apparatus according to claim 1, wherein the IC medium reader/writer records the number of copies that can be made of the content stored in the memory unit on the IC medium in association with a hash value of the content, and the controller calculates an hash value of the content stored in the memory unit when the content is copied to the external recording medium, determines whether the hash value calculated is recorded on the IC medium and, when it is determined that the hash value calculated is recorded on the IC medium, controls the writing unit to write the content on the external recording medium, as well as controlling the IC medium reader/writer to update the number of copies that can be made recorded in association with the hash value of the content and record an updated number on the IC medium.

5. The information processing apparatus according to claim 4, wherein the controller controls the writing unit to prohibit copying the content to the external recording medium when it is determined that the hash value calculated is not recorded on the IC medium.

* * * * *